US 10,248,640 B2

United States Patent
Pereira et al.

(10) Patent No.: US 10,248,640 B2
(45) Date of Patent: Apr. 2, 2019

(54) INPUT-MODE-BASED TEXT DELETION

(71) Applicant: MICROSOFT TECHNOLOGY LICENSING, LLC, Redmond, WA (US)

(72) Inventors: Alexandre Pereira, Seattle, WA (US); Robert Joseph Disano, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 69 days.

(21) Appl. No.: 15/015,927

(22) Filed: Feb. 4, 2016

(65) Prior Publication Data

US 2016/0232147 A1 Aug. 11, 2016

(51) Int. Cl.
*G06F 17/24* (2006.01)
*G06F 3/0489* (2013.01)
*G06F 3/0488* (2013.01)

(52) U.S. Cl.
CPC .......... *G06F 17/243* (2013.01); *G06F 3/0489* (2013.01); *G06F 3/04883* (2013.01);
(Continued)

(58) Field of Classification Search
CPC ............. G06F 3/04883; G06F 3/04886; G06F 3/0489; G06F 17/24; G06F 17/243; G06F 2203/0381
(Continued)

(56) References Cited

U.S. PATENT DOCUMENTS 8,576,167 B2 11/2013 Longe et al.
9,035,884 B2 * 5/2015 Phillips ................. G06F 17/275
341/22
(Continued)

FOREIGN PATENT DOCUMENTS

EP 0840289 A2 5/1998
KR 20070063732 A 6/2007

OTHER PUBLICATIONS

Ryan Paul; Hands-on: Swype keyboard for Android is sweeptastic; Jul. 9, 2010; Ars Technica; pp. 1-14.*
(Continued)

*Primary Examiner* — Andrew R Dyer
(74) *Attorney, Agent, or Firm* — Shook, Hardy & Bacon L.L.P.

(57) ABSTRACT

Systems, methods, and computer-readable storage media are provided for deleting textual input based upon the input-mode in which such textual input is received. Textual input is received via a block-unit-based input and the textual input is converted into a typewritten text segment and displayed in association with a user computing device. The typewritten text segment includes character-units that substantially comprise at least one recognizable block-unit. Upon receipt of a plurality of delete commands, at least a portion of the typewritten text segment is deleted in accordance with the recognizable block-units. That is, one block-unit is deleted for each delete command received. Upon recognition of a boundary between text received via a block-unit-based input modality and a character-based input modality, the action of the delete command is altered such that one character-unit is deleted for each delete command received in accordance with the input modality.

16 Claims, 4 Drawing Sheets

(52) U.S. Cl.
CPC .......... *G06F 3/04886* (2013.01); *G06F 17/24* (2013.01); *G06F 2203/0381* (2013.01)

(58) Field of Classification Search
USPC ................................................ 715/256, 271
See application file for complete search history.

(56) References Cited

U.S. PATENT DOCUMENTS

| | | | | |
|---|---|---|---|---|
| 9,548,012 | B1* | 1/2017 | Sjoberg | G06F 3/04886 |
| 2005/0099406 | A1* | 5/2005 | Pettiross | G06F 3/0236 345/179 |
| 2012/0215531 | A1* | 8/2012 | Grobauer | G06F 3/038 704/231 |
| 2012/0303371 | A1 | 11/2012 | Labsky et al. | |
| 2012/0304057 | A1 | 11/2012 | Labsky et al. | |
| 2013/0024809 | A1* | 1/2013 | Voonna | G06F 3/0233 715/786 |
| 2015/0002275 | A1* | 1/2015 | Jantunen | H04W 4/008 340/10.51 |
| 2015/0121285 | A1* | 4/2015 | Eleftheriou | G06F 3/04842 715/773 |

OTHER PUBLICATIONS

"International Preliminary Report on Patentability Issued in PCT Application No. PCT/US2016/016748", dated May 17, 2017, 11 Pages.

Zhai, et al. "Introduction to Shape Reporting" In Proceedings of IBM Research Report, Nov. 1, 2006, 18 pages.

Kumar, et al., "Voice Typing: A New Speech Interaction Model for Dictation on Touchscreen Devices", In Proceedings of the SIGCHI Conference on Human Factors in Computing Systems, May 5, 2012, 9 Pages.

"Second Written Opinion Issued in PCT Application No. PCT/US2016/016748", dated Aug. 11, 2016, 10 Pages.

"International Search Report and Written Opinion Issued in PCT Application No. PCT/US2016/016748", dated May 10, 2016, 16 Pages.

"AdaptxtTM Smartphone User Manual", Retrieved on: Jul. 9, 2014, Available at: http://adaptxt.com/adaptxtlive/sites/default/files/newspdf/Adaptxt_for_Android_Smartphone_User_Guide.pdf, pp. 1-25.

"Velocity Keyboard Free" Published on: Mar. 21, 2014 Available at: https://play.google.com/store/apps/details?id=com.noemacorp.velocity.trial, pp. 1-4.

Diamonds, Stephanie, "How to Delete Text with NaturallySpeaking", Published on: Feb. 4, 2012 Available at: http://www.dummies.com/how-to/content/how-to-delete-text-with-naturallyspeaking.html, pp. 1-2.

Zhai, et al. "Introduction to Shape Reporting" In Proceedings of IBM Research Report, Nov. 1, 2006, pp. 1-18.

Kumar, et al., "Voice Typing: A New Speech Interaction Model for Dictation on Touchscreen Devices", In Proceedings of the SIGCHI Conference on Human Factors in Computing Systems, May 5, 2012, pp. 2278-2285.

"Office Action Issued in European Patent Application No. 16705678.7", dated Dec. 19, 2018, 13 Pages.

* cited by examiner

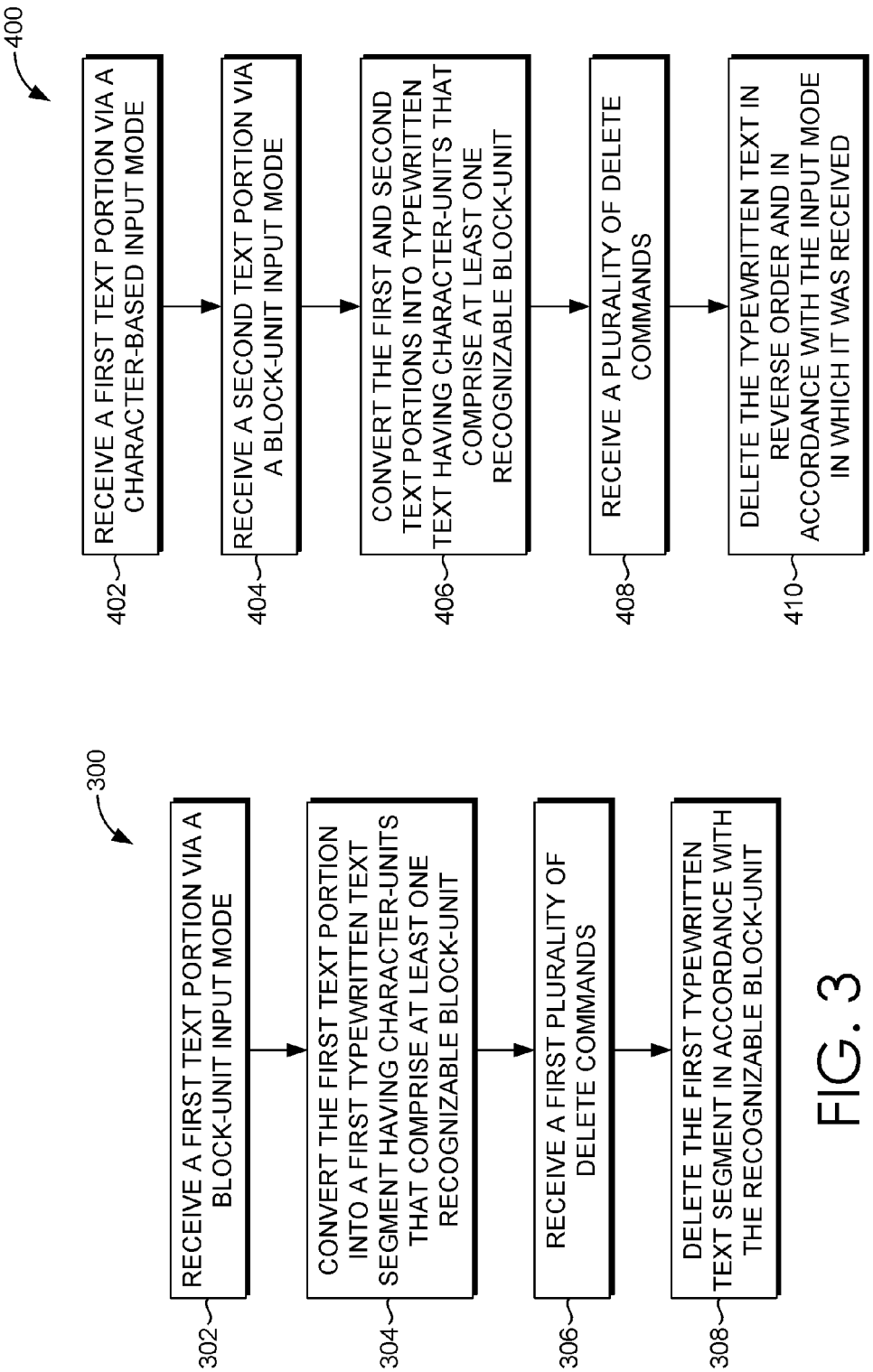

INPUT-MODE-BASED TEXT DELETION

CROSS-REFERENCE TO RELATED APPLICATIONS

This application claims priority to U.S. Provisional Patent Application No. 62/112,479 filed Feb. 5, 2015 and entitled "Input-Mode-Based Text Deletion," which application is hereby incorporated by reference as if set forth in its entirety herein.

BACKGROUND

Modern computing devices afford users the ability to input text using multiple modalities. For instance, users may input text via touch-typing or tapping-touch utilizing an external keyboard/keypad, a touch screen keyboard/keypad or the like, wherein text is input on a character-by-character basis (e.g., letter-by-letter or stroke-by-stroke) as a user selects the appropriate character key (or combination of keys) on the touch-typing input device. Alternatively, users may input text via block-unit-based modalities where input is substantially based on units that are larger than character-by-character, for instance, word-by-word, phrase-by-phrase, sentence-by-sentence, or the like. Exemplary block-unit-based modalities may include voice (e.g., dictation), shape-writing, handwriting, and gesture inputs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for deleting textual input based upon the input-mode in which such textual input is received. Textual input is received via a block-unit input mode (e.g., voice, shape-writing, handwriting and/or gesture input) and the textual input is converted into a typewritten text segment and displayed in association with a user computing device. The typewritten text segment includes character-units (e.g., letters) that substantially comprise at least one recognizable block-unit (e.g., a word). Upon receipt of a plurality of delete commands (for instance, upon receiving an indication that a user multiple times has selected the "backspace" key on an external or touchscreen keyboard/keypad), at least a portion of the typewritten text segment is deleted in accordance with the recognizable block-units. That is, one block-unit (e.g., word) is deleted for each delete command received. Upon recognition of a boundary between text received via a block-unit-based input modality and a character-based input modality, the action of the delete command may be altered such that one character-unit is deleted for each delete command received in accordance with the input modality.

Embodiments of the present technology provide an automatic functionality that permits rapid, block-unit-based deletion of typewritten text segments converted from block-unit-based textual input. The functionality is automatic in that it may apply without a user having to select such functionality in instances where textual input is received via an appropriate modality and may not apply where textual input is alternately received, for instance, via a character-by-character input modality. Thus, large-scale errors in the recognition of user intent may be addressed on a commensurate scale enhancing the overall user experience in utilizing such block-based input modalities.

BRIEF DESCRIPTION OF THE DRAWINGS

The present technology is illustrated by way of example and not limitation in the accompanying figures in which like reference numerals indicate similar elements and in which:

FIG. 3 is a flow diagram showing an exemplary method for deleting text based on input modality, in accordance with an embodiment of the present technology;

FIG. 4 is a flow diagram showing another exemplary method for deleting text based on input modality, in accordance with an embodiment of the present technology.

DETAILED DESCRIPTION

Figure 1:
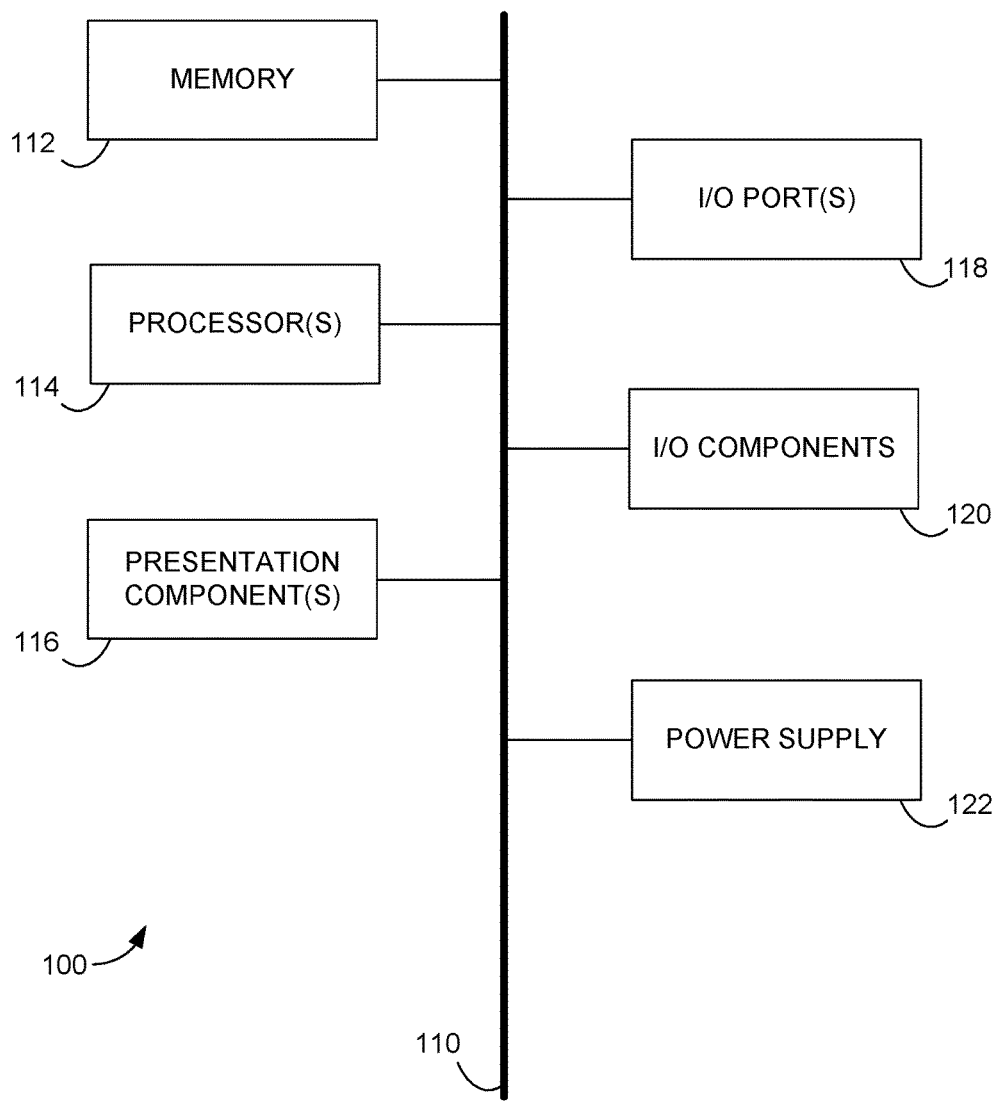
FIG. 1 is a block diagram of an exemplary computing environment suitable for use in implementing embodiments of the present technology.

The subject matter of the present technology is described with specificity herein to meet statutory requirements. However, the description itself is not intended to limit the scope of this patent application. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for deleting textual input based upon the input-mode in which such textual input is received. Textual input is received via a block-unit-based input mode (e.g., voice, shape-writing, handwriting and/or gesture) and the textual input is converted into a typewritten text segment and displayed in association with a user computing device. The typewritten text segment includes character-units (e.g., letters) that substantially comprise at least one recognizable block-unit (e.g., a word). Upon receipt of a plurality of delete commands (for instance, upon receiving an indication that a user multiple times has selected the "backspace" key on an external or touchscreen keyboard/keypad), at least a portion of the typewritten text segment is deleted in accordance with the recognizable block-units. That is, one block-unit (e.g., word) is deleted for each delete command received. Upon recognition of a boundary between text received via a block-unit-based input modality and a character-based input modality, the action of the delete command may be altered such that one character-unit is deleted for each delete command received in accordance with the input modality.

Embodiments of the present technology provide an automatic functionality that permits rapid, block-unit-based deletion of typewritten text segments converted from block-unit-based textual input. The functionality is automatic in that it may apply without a user having to select such functionality in instances where textual input is received via an appropriate modality and may not apply where textual input is alternately received, for instance, via a character-by-character input modality. Thus, large-scale errors in the recognition of user intent may be addressed on a commensurate scale enhancing the overall user experience in utilizing such block-based input modalities.

Accordingly, one embodiment of the present technology is directed to a method being performed by one or more computing devices including at least one processor, the method for deleting textual input. The method includes receiving a first text portion via a block-unit input mode; converting the first text portion into a first typewritten text segment, the first typewritten text segment having character-units that substantially comprise at least one recognizable block-unit, each block-unit having a plurality of character-units; receiving a first plurality of delete commands, each delete command of the first plurality directing deletion of one block-unit of the first typewritten text segment; and deleting at least a portion of the first typewritten text segment in accordance with the at least one recognizable block-unit.

In another embodiment, the present technology is directed to a system for deleting textual input, the system including an input conversion engine and an input-mode-based deletion engine. The input conversion engine includes a first input conversion component and a second input conversion component. The first input conversion component is configured to receive a first text portion input via a character-based input mode and convert the first text portion into a first typewritten text segment for display in a text input field of a user computing device. The second input conversion component is configured to receive a second text portion input via a block-unit input mode and convert the second text portion into a second typewritten text segment for display in the text input field of the user computing device. The first and second typewritten text segments collectively comprise an editable section of typewritten text, and each of the first and second typewritten text segments include character-units that substantially comprise at least one recognizable block-unit. The input-mode-based deletion engine is configured to receive a plurality of delete commands, each delete command directing deletion of a portion of the typewritten text section, and delete the directed portions of the typewritten text section in reverse order relative to an order in which directed portions were received and in accordance with the input mode in which each directed portion of the typewritten text section was received.

In yet another embodiment, the present technology is directed to a method being performed by one or more computing devices including at least one processor, the method for deleting dictated textual input. The method includes receiving dictated textual input; converting the dictated textual input into typewritten text, the typewritten text having character-units that comprise at least one recognizable larger unit; receiving a plurality of delete commands, each delete command directing deletion of at least a portion of the typewritten text; and deleting at least the portion of the typewritten text in accordance with the at least one recognizable larger unit and in reverse order relative to an order in which the dictated textual input that was converted into the typewritten text was received.

Having briefly described an overview of embodiments of the present technology, an exemplary operating environment in which embodiments of the present technology may be implemented is described below in order to provide a general context for various aspects of the present technology. Referring to the figures in general and initially to FIG. 1 in particular, an exemplary operating environment for implementing embodiments of the present technology is shown and designated generally as computing device 100. The computing device 100 is but one example of a suitable computing environment and is not intended to suggest any limitation as to the scope of use or functionality of embodiments of the technology. Neither should the computing device 100 be interpreted as having any dependency or requirement relating to any one component nor any combination of components illustrated.

Embodiments of the technology may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the technology may be practiced in a variety of system configurations, including, but not limited to, hand-held devices, consumer electronics, general-purpose computers, more specialty computing devices, and the like. Embodiments of the technology may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 100. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

The computer-useable instructions form an interface to allow a computer to react according to a source of input. The instructions cooperate with other code segments to initiate a variety of tasks in response to data received in conjunction with the source of the received data.

Furthermore, although the terms "rapid text deletion module," "input conversion engine," "input-mode-based deletion engine" and "boundary labeling engine" are used herein, it will be recognized that these terms may also encompass servers, web browsers, sets of one or more processes distributed on one or more computers, one or more stand-alone storage devices, sets of one or more other computing or storage devices, any combination of one or more of the above, and the like.

Figure 2:
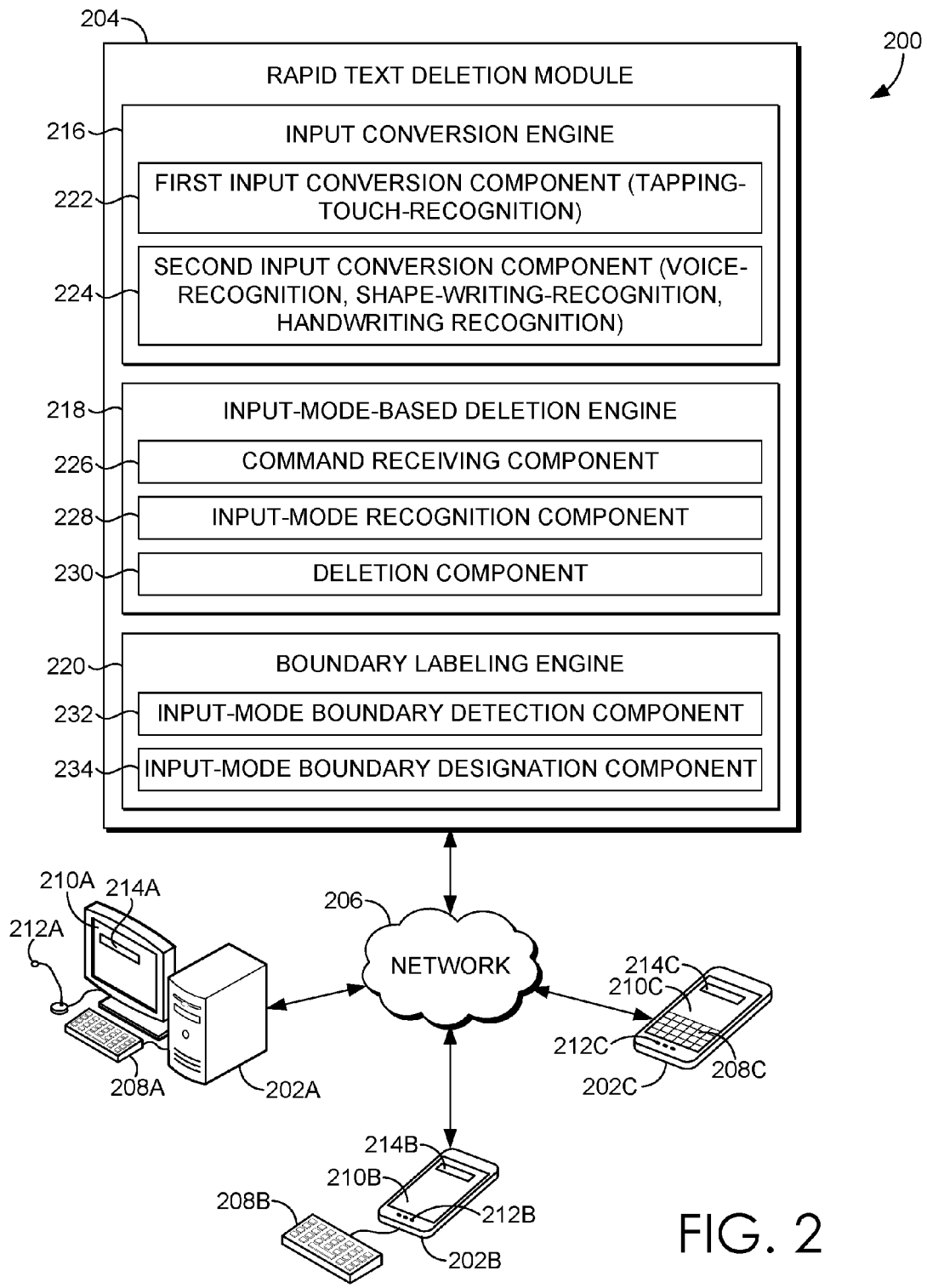
FIG. 2 is a block diagram of an exemplary computing system in which embodiments of the technology may be employed.

As previously set forth, embodiments of the present technology provide systems, methods, and computer-readable storage media for deleting textual input based on the input mode in which it is received. With reference to FIG. 2, a block diagram is provided illustrating an exemplary computing system 200 in which embodiments of the present technology may be employed. Generally, the computing system 200 illustrates an environment in which textual input received via a character-based input modality may be deleted character-by-character, and textual input received via a block-unit-based modality (e.g., voice, shape-writing, handwriting, gesture, and the like) may be deleted on a block-unit basis, in accordance with the methods, for instance, illustrated in FIGS. 3, 4 and 5 (more fully described below). Among other components not shown, the computing system 200 generally includes one or more user computing devices 202A, 202B, 202C, and a rapid text deletion module 204, in communication with one another via a network 206. The network 206 may include, without limitation, one or more local area networks (LANs) and/or wide area networks (WANs). Such networking environments are commonplace in offices, enterprise-wide computer networks, intranets and the Internet. Accordingly, the network 206 is not further described herein.

It should be understood that any number of user computing devices 202A, 202B, 202C and/or rapid text deletion modules 204 may be employed in the computing system 200 within the scope of embodiments of the present technology. Each may comprise a single device/interface or multiple devices/interfaces cooperating in a distributed environment. For instance, the rapid text deletion module 204 may comprise multiple devices and/or modules arranged in a distributed environment that collectively provide the functionality of the rapid text deletion module 204 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 202A, 202B, 202C, the rapid text deletion module 204, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of rapid text deletion modules and/or user computing devices. By way of example only, the rapid text deletion module 204 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 202A, 202B, 202C may include any type of computing device, such as the computing device 100 described with reference to FIG. 1, for example. The user computing device 202A, 202B, 202C generally is configured to receive textual input (generally input via an I/O component, such as a stylus or keyboard/keypad, via a user interface presented on an associated display screen and permitting alpha-numeric, shape-written and/or handwritten input into a designated input region, and/or via a voice input mechanism such as a microphone). Generally, the user computing device may be a desktop computing device 202A having an external inputting component 208A (such as an external keyboard, keypad, or the like), a mobile computing device 202B having an inputting component 208B that is separate and distinct from a display screen 210B, or a mobile or desktop computing device 202C having an inputting component 208C integrated with the display screen 210C thereof (e.g., a touchscreen keyboard/keypad, or the like). User computing devices 202A, 202B, 202C in accordance with embodiments hereof may include any combination of external and integrated inputting devices. In embodiments, user computing devices suitable for use with embodiments of the present technology may include a microphone 212A, 212B, 212C or other listening device for accepting voice input. Any and all such variations, and any combination thereof, are contemplated to be within the scope of embodiments of the present technology. It should be noted that the embodiments of the present technology are equally applicable to mobile computing devices and devices accepting gesture, touch and/or voice input and accordingly may have external and/or integrated cameras (not shown), motion detection mechanisms (not shown) and the like. Any and all such variations, and any combination thereof, are contemplated to be within the scope of embodiments of the present technology. Text input via any of the available input mechanisms, once converted into a typewritten text segment (more fully described below), may be displayed in a text input field 214A, 214B, 214C associated with the display screen 201a, 212B, 212C, respectively.

The rapid text deletion module 204 is configured to, among other things, receive text input via character-based and/or block-unit input modes and delete such text, once converted to typewritten text, in accordance with the input modality in which it was received. As illustrated, the rapid text deletion module 204 includes an input conversion engine 216, an input-mode-based deletion engine 218 and a boundary labeling engine 220. The input conversion engine 216 includes a first input conversion component 222 and a second input conversion component 224. In embodiments, the first input conversion component 222 may be a tapping-touch recognition component configured to recognize character-based input received, for instance, via a tapping-touch input such as an external or integrated keyboard/keypad, or the like. The first input conversion component 222 may thus be configured to receive tapping-touch, character-based textual input and convert such input into typewritten text configured for display in association with a text input field 212A, 212B, 212C of a user computing device 202A, 202B, 202C. It will be understood by those or ordinary skill in the art that the first input conversion component 222 may be configured to receive any character-based textual input and is not intended to be limited to tapping-touch inputs.

In embodiments, the second input conversion component 224 may be any conversion component configured to receive block-unit-based textual input. Block-unit-based textual input may include any textual input that is recognized by the system 200 in other than character-based units. For instance, block-unit-based textual input may include, by way of example only, word-based input, sentence-based input, phrase-based input, paragraph-based input, and the like. Any and all such variations, and any combination thereof, are contemplated to be within the scope of embodiments of the present technology. Block-unit-based textual input generally substantially includes at least one recognizable block-unit, each block-unit including one or more character units. It will be understood by those of ordinary skill in the art that block-unit-based textual input may include words that are comprised of single characters (e.g., "a," "I," and the like) as well as punctuation units that are generally comprised of single characters (e.g., a period, a comma, or the like). Thus, use of the term "substantially" herein when referring to typewritten segments having character-units that "substantially" comprise recognizable block-units is intended to account for such scenarios that are typical and well-known artifacts of a given language. Having one or more of such single character units amidst a segment of block-unit-based text does not render the text other than block-unit-based.

In accordance with embodiments hereof, the second input conversion component 224 may comprise, by way of example only, a voice-recognition component, a shape-writing recognition component, a handwriting recognition component, a gesture recognition component, or any combination thereof. Where the second input conversion component 224 comprises a voice-recognition component, the second input conversion component 224 may be configured to recognize block-unit-based voice input and convert such input into typewritten text configured for display in association with a text input field 212A, 212B, 212C of a user computing device 202A, 202B, 202C. Where the second input conversion component 224 comprises a shape-writing recognition component, the second input conversion component 224 may be configured to recognize block-unit-based shape-writing input and convert such input into typewritten text configured for display in association with the text input field 212A, 212B, 212C of a user computing device 202A, 202B, 202C. Where the second input conversion component 224 comprises a handwriting recognition component, the second input conversion component 224 may be configured to recognize block-unit-based handwriting input and convert such input into typewritten text configured for display in association with the text input field 212A, 212B, 212C of a user computing device 202A, 202B, 202C. Where the second input conversion component 224 comprises a gesture recognition component, the second input conversion component 224 may be configured to recognize block-unit-based gesture input and convert such input into typewritten text configured for display in association with the text input field 212A, 212B, 212C of a user computing device 202A, 202B, 202C. It will be understood by those or ordinary skill in the art that the second input conversion component 224 may be configured to receive any block-unit-based textual input and is not intended to be limited to the voice, shape-writing, handwriting and gesture inputs described herein.

As illustrated, the input-mode-based deletion engine 218 includes a command receiving component 226, an input-mode recognition component 228 and a deletion component 230. The command receiving component 226 is configured to receive a plurality of delete commands, each delete command directing deletion of a unit of typewritten text commensurate with the input-mode in which the textual input that was converted into the typewritten text is received. In this regard, the input-mode recognition component is configured to recognize the mode (e.g., character-based or block-unit-based) in which a portion of textual input for which a "delete" command is received was input. The deletion component 230 of the input-mode-based deletion engine 218 is configured to delete the typewritten text as directed in accordance with the input mode recognized by the input-mode recognition component 228. Thus, where the input-mode recognition component 228 recognizes a typewritten text segment to have been converted from text input in a character-based mode, the deletion component 230 is configured to delete the typewritten text on a character-by-character basis, one character being deleted for each of the plurality of delete commands received. Similarly, where the input-mode recognition component 228 recognizes a typewritten text segment to have been converted from text input in a block-unit-based mode, the deletion component 230 is configured to delete the typewritten text on a block-unit basis commensurate with the block-unit in which it was received, one block-unit being deleted for each of the plurality of delete commands received. Thus, if the textual input was received on a word-by-word basis, such text may be deleted on a word-by-word basis. However, if the textual input was received on a sentence-by-sentence basis, such text may be deleted on a sentence-by-sentence basis. In embodiments, the units comprising a typewritten text segment may be deleted in reverse order relative to an order in which they were received.

In accordance with embodiments hereof, the input mode is a transient state; either character-based or block-unit-based, whichever comprises the most recent form of input. When the focus (e.g., the cursor) is placed in a field configured for receipt of input, by default the input mode is character-based. Once textual input is received via a block-unit-based method (e.g., dictation), the input mode remains block-unit-based until either the focus is moved out of the input field or the user switches to a character-based input method (e.g., touch typing). If either event occurs, deletion behavior for all previously input text returns to character-based deletion. It will be understood and appreciated by those having ordinary skill in the art that embodiments wherein the default input mode is block-unit-based are also contemplated to be within the scope of the present technology.

In embodiments, a delete command may be recognized by the command receiving component 226 as a user selection of a particular designated keypad key on an external or integrated (e.g., touchscreen) keyboard/keypad, for instance, a "backspace" key. In embodiments, the command receiving component 226 of the input-mode-based deletion engine 218 further may be configured to receive commands other than delete commands. For instance, the command receiving component 226 of the input-mode-based deletion engine 218 may be configured to receive and recognize a user selection of a key other than the "backspace" key and/or manual placement of a cursor in a different location. In embodiments, the input-mode recognition component 228 may be configured to recognize commands other than the delete command as an indication to alter block-unit-based deletion such that subsequently received deletion commands will translate into character-by-character deletions, regardless of the input modality in which the textual input that was converted into a segment of typewritten text is received.

As illustrated, the boundary labeling engine 220 of the rapid text deletion module 204 includes an input-mode boundary detection component 232 and an input-mode boundary designation component 234. At times, a segment of typewritten text may include both character-unit based textual input and block-unit based textual input. As the rapid text deletion module 204 in accordance with embodiments of the present technology is configured to delete typewritten text in accordance with the input modality in which the corresponding textual input was received, the boundary labeling engine 220 is configured to recognize when a boundary between text received via a character-based modality and text received via a block-unit based modality is present. In this regard, the input-mode boundary detection component 232 is configured to recognize such boundaries and the input-mode boundary designation component 234 is configured to provide a visual designation of such boundaries. Such visual designation may be accomplished via any visual emphasis method. That is, visual boundary designation may be accomplished utilizing any suitable technique such as shading, altering font type, color, and/or size, underling, bolding, italicizing, or the like, the typewritten text that will be deleted via a current deletion modality relative to text that will be deleted via a different deletion modality due to the input modality in which it was received. A visual boundary designation, e.g., a vertical or horizontal line, or the like, may also be utilized in accordance with embodiments hereof.

Turning now to FIG. 3, a flow diagram is illustrated showing an exemplary method 300 for deleting textual input. As indicated at block 302, a first text portion is received via a block-unit input mode (e.g., voice, shape-writing, handwriting, gesture, or the like). Such text portion may be received, for instance, by the input conversion engine 216 of the rapid text deletion module 204 of FIG. 2. As indicated at block 304, the first text portion is converted into a first typewritten text segment, the first typewritten text segment having character-units (e.g., letters) that substantially comprise at least one recognizable block-unit (e.g., word), each block-unit having a plurality of character-units. Such conversion may be accomplished, for instance, by the input conversion engine 216 of FIG. 2. As indicated at block 306, a first plurality of delete commands (e.g., user selections of a "backspace" key) is received, each delete command of the first plurality directing deletion of one block-unit of the first typewritten text segment. The delete commands may be received, for instance, by the command receiving component 226 of the input-mode-based deletion engine 218 of the rapid text deletion module 204 of FIG. 2. As indicated at block 308, at least a portion of the first typewritten text segment is deleted in accordance with the at least one recognizable block-unit. Such deletion may be accomplished, for instance, by the deletion component 230 of the input-mode-based deletion engine 218 of FIG. 2.

With reference to FIG. 4, a flow diagram is illustrated showing another exemplary method 400 for deleting textual input. As indicated at block 402, a first text portion is received via a character-based input mode (e.g., tapping touch). Such text portion may be received, for instance, via the first input conversion component 222 of the input conversion engine 216 of the rapid text deletion module 204 of FIG. 2. As indicated at block 404, a second text portion is received via a block-unit input mode (e.g., voice, shape-writing, handwriting, gesture, or the like). Such text portion may be received, for instance, by the second input conversion component 224 of the input conversion engine 216 of the rapid text deletion module 204 of FIG. 2. As indicated at block 406, the first text portion and the second text portion are converted into typewritten text, the typewritten text having character-units (e.g., letters) that substantially comprise at least one recognizable block-unit (e.g., word), each block-unit having a plurality of character-units. Such conversion may be accomplished, for instance, by the input conversion engine 216 of FIG. 2. As indicated at block 408, a plurality of delete commands (e.g., user selections of a "backspace" key) is received, each delete command of the plurality directing deletion of one unit of the typewritten text. The delete commands may be received, for instance, by the command receiving component 226 of the input-mode-based deletion engine 218 of the rapid text deletion module 204 of FIG. 2. As indicated at block 410, at least a portion of the typewritten text is deleted in accordance with the input mode in which it was received. Such deletion may be accomplished, for instance, by the deletion component 230 of the input-mode-based deletion engine 218 of FIG. 2.

Figure 5:
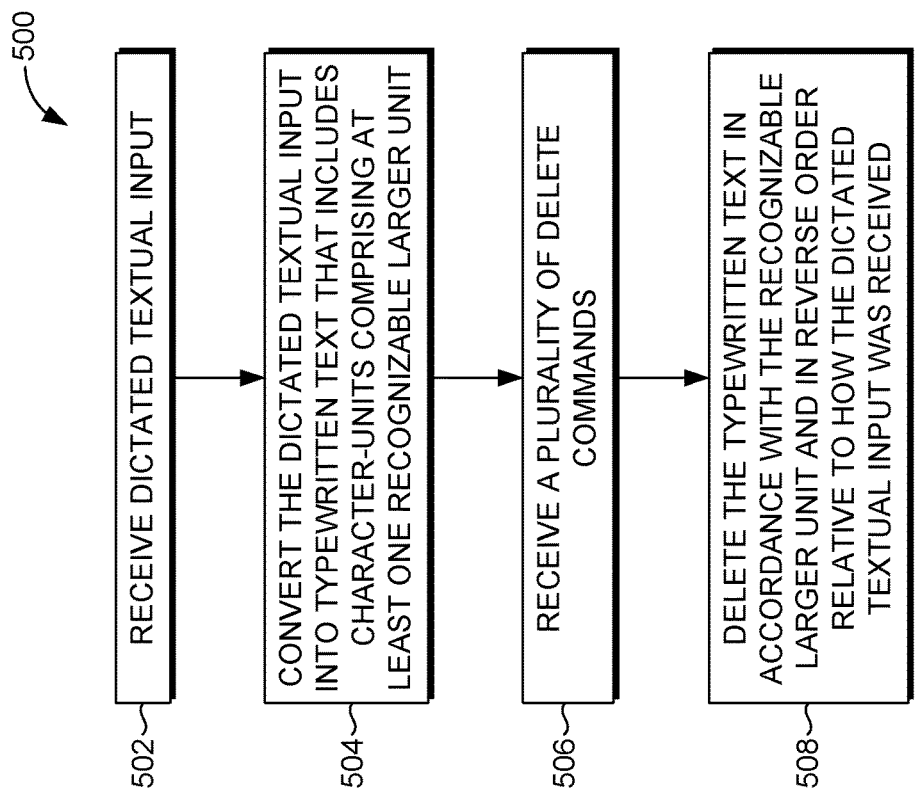
FIG. 5 is a flow diagram showing an exemplary method for deleting dictated textual input substantially as block-units, in accordance with an embodiment of the present technology.

Turning now to FIG. 5, a flow diagram is illustrated showing an exemplary method 300 for deleting dictated textual input. As indicated at block 502, dictated textual input is received, for instance, via the input conversion engine 216 of the rapid text deletion module 204 of FIG. 2. As indicated at block 504, the dictated textual input is converted into typewritten text, the typewritten text having character-units that comprise at least one recognizable larger unit. Such conversion may be accomplished, for instance, utilizing the input conversion engine 216 of FIG. 2. As indicated at block 506, a plurality of delete commands is received (e.g., by the command receiving component 226 of the input-mode-based deletion engine 218 of FIG. 2), each delete command directing deletion of at least a portion of the typewritten text. As indicated at block 508, at least a portion of the typewritten text is deleted in accordance with the at least one recognizable larger unit and in reverse order relative to an order in which the dictated textual input that was converted into the typewritten text was received. Such deletion may be accomplished, for instance, utilizing the deletion component 230 of the input-mode-based deletion engine 218 of FIG. 2.

As can be understood, embodiments of the present technology provide systems, methods, and computer-readable storage media for, among other things, deleting textual input based upon the input-mode in which such textual input is received. Textual input is received via a block-unit input mode (e.g., voice, shape-writing, handwriting and/or gesture input) and the textual input is converted into a typewritten text segment and displayed in association with a user computing device. The typewritten text segment includes character-units (e.g., letters) that substantially comprise at least one recognizable block-unit (e.g., a word). Upon receipt of a plurality of delete commands (for instance, upon receiving an indication that a user multiple times has selected the "backspace" key on an external or touchscreen keyboard/keypad), at least a portion of the typewritten text segment is deleted in accordance with the recognizable block-units. That is, one block-unit (e.g., word) is deleted for each delete command received. Upon recognition of a boundary between text received via a block-unit-based input modality and a character-based input modality, the action of the delete command may be altered such that one character-unit is deleted for each delete command received in accordance with the input modality.

The present technology has been described in relation to particular embodiments, which are intended in all respects to be illustrative rather than restrictive. Alternative embodiments will become apparent to those of ordinary skill in the art to which the present technology pertains without departing from its scope.

While the technology is susceptible to various modifications and alternative constructions, certain illustrated embodiments thereof are shown in the drawings and have been described above in detail. It should be understood, however, that there is no intention to limit the technology to the specific forms disclosed, but on the contrary, the intention is to cover all modifications, alternative constructions, and equivalents falling within the spirit and scope of the technology.

It will be understood by those of ordinary skill in the art that the order of steps shown in the methods 300 of FIG. 3, 400 of FIG. 4, and 500 of FIG. 5 is not meant to limit the scope of the present technology in any way and, in fact, the steps may occur in a variety of different sequences within embodiments hereof. Any and all such variations, and any combination thereof, are contemplated to be within the scope of embodiments of the present technology.

What is claimed is:

1. A method being performed by one or more computing devices including at least one processor, the method for deleting textual input and comprising:
   receiving a first text portion via a block-unit input mode;
   converting the first text portion into a first typewritten text segment, the first typewritten text segment having character-units that comprise at least a first recognizable block-unit, each block-unit of the at least the first recognizable block-unit having a plurality of character-units;
   receiving a second typewritten text segment via a character-based input mode, the second typewritten text segment having character-units that comprise at least a second recognizable block-unit, each block-unit of the at least the second recognizable block-unit having a plurality of character-units;
   detecting a location of a boundary between the first typewritten text segment that was input via the block-unit input mode and the second typewritten text segment that was input via the character-based input mode;
   visually designating the boundary;
   receiving a plurality of delete commands, wherein a first portion of the plurality of delete commands directs deletion of at least a portion of the first typewritten text segment, and wherein a second portion of the plurality of delete commands directs deletion of at least a portion of the second typewritten text segment; and
   subsequent to the receiving the plurality of delete commands, deleting at least a portion of the first and second typewritten text segments, wherein the deleting comprises: deleting at least a portion of the first typewritten text segment on a block-unit basis, one block unit being deleted for each of the first portion of the plurality of delete commands; detecting the boundary between the first and second typewritten text segments; and based on the detecting the boundary, altering the delete command so that at least a portion of the second typewritten text segment is deleted on a character by character basis, one character unit being deleted for each of the second portion of the plurality of delete commands.

2. The method of claim 1, wherein the block-unit input mode is one of a voice-recognition input mode, a shape-writing input mode, a handwriting-recognition input mode, and a gesture-recognition input mode.

3. The method of claim 1, further comprising deleting the block-units comprising the first typewritten text segment in reverse order relative to an order in which the block-units comprising the first typewritten text segment are received.

4. The method of claim 1, wherein receiving the plurality of delete commands comprises receiving a plurality of selections of a designated keypad key.

5. The method of claim 4, further comprising:
receiving a functional indication other than selection of the designated keypad key prior to receiving all of the plurality of delete commands, wherein, subsequent to the receiving the functional indication, each subsequent delete command of the plurality of delete commands directs deletion of one character-unit of the first typewritten text segment.

6. The method of claim 5, wherein the functional indication is one of: selection of a keypad key other than the designated keypad key; or manual placement of a cursor relative to the first typewritten text segment.

7. The method of claim 1, wherein the character-based input mode is a tapping touch input mode.

8. The method of claim 1, wherein a punctuation unit received via the block-unit input mode is recognized as at least a portion of a block-unit for purposes of deleting the punctuation unit, and wherein a punctuation unit received via the character-based input mode is recognized as a character-unit for purposes of deleting the punctuation unit.

9. A computerized system for rapidly deleting textual input, the computerized system comprising:
one or more processors; and
computer storage media comprising computer-usable instructions that, when executed by the one or more processors, cause the one or more processors to:
receive a first text portion input via a character-based input mode;
convert the first text portion into a first typewritten text segment for display in a text input field of a user computing device;
receive a second text portion input via a block-unit input mode;
convert the second text portion into a second typewritten text segment for display in the text input field of the user computing device,
wherein the first and second typewritten text segments collectively comprise an editable section of typewritten text,
and wherein each of the first and second typewritten text segments include character-units that comprise at least one recognizable block-unit;
detect a location of a boundary between the first typewritten text segment that was input via the character-based input mode and the second typewritten text segment that was input via the block-unit input mode;
visually designate the boundary;
receive a plurality of delete commands, wherein a first portion of the plurality of delete commands directs deletion of at least a portion of the first typewritten text segment, and wherein a second portion of the plurality of delete commands directs deletion of at least a portion of the second typewritten text segment;
wherein, upon receiving the plurality of delete commands, the one or more processors:
delete at least a portion of the first typewritten text segment on a character by character basis, one character unit being deleted for each of the first portion of the plurality of delete commands;
detect the boundary between the first and second typewritten text segments; and
wherein, upon detection of the boundary, the one or more processors alter the delete command so that at least a portion of the second typewritten text segment is deleted on a block-unit basis, one block-unit being deleted for each of the second portion of the plurality of delete commands.

10. The computerized system of claim 9, wherein the character-based input mode comprises a tapping-touch input mode.

11. The computerized system of claim 9, wherein the block-unit input mode comprises at least one of voice-recognition input mode, a shape-writing-recognition input mode, a handwriting-recognition input mode, and a gesture-recognition input mode.

12. The computerized system of claim 9, wherein a punctuation unit received via the block-unit input mode is recognized as at least a portion of a block-unit and a punctuation unit received via the character-based input mode is recognized as a character-unit.

13. A method being performed by one or more computing devices including at least one processor, the method for deleting textual input and comprising:
receiving dictated textual input;
converting the dictated textual input into a first typewritten text segment, the first typewritten text segment having character-units that comprise a first recognizable block unit, the first recognizable block unit including a plurality of character-units;
receiving a second typewritten text segment via a character-based input mode, the second typewritten text segment having character-units that comprise at least a second recognizable block-unit, each block-unit of the at least the second recognizable block-unit having a plurality of character-units;
detecting a location of a boundary between the first typewritten text segment that was input via the block-unit input mode and the second typewritten text segment that was input via the character-based input mode;
visually designating the boundary;
receiving a plurality of delete commands, wherein a first portion of the plurality of delete commands directs deletion of at least a portion of the first typewritten text segment, and wherein a second portion of the plurality of delete commands directs deletion of at least a portion of the second typewritten text segment;
subsequent to the receiving the plurality of delete commands, deleting at least a portion of the first and second typewritten text segments, wherein the deleting comprises: deleting at least a portion of the first typewritten text segment on a block-unit basis, one block unit being deleted for each of the first portion of the plurality of delete commands; detecting the boundary between the first and second typewritten text segments; and based on the detecting the boundary, altering the delete command so that at least a portion of the second typewritten text segment is deleted on a character by character basis, one character unit being deleted for each of the second portion of the plurality of delete commands.

14. The method of claim 13, wherein the receiving a plurality of delete commands comprises receiving a plurality of selections of a designated keypad key.

15. The method of claim 14, further comprising:
receiving a functional indication other than selection of the designated keypad key prior to receiving all of the plurality of delete commands, wherein, subsequent to the receiving the functional indication, each subsequent delete command of the plurality of delete commands directs deletion of one character-unit of the typewritten text.

16. The method of claim 15, wherein the functional indication is one of: selection of a keypad key other than the designated keypad key; or manual placement of a cursor relative to the first typewritten text segment.

* * * * *